(12) United States Patent
Cheynet de Beaupre et al.

(10) Patent No.: US 10,689,133 B2
(45) Date of Patent: Jun. 23, 2020

(54) SATELLITE WITH CYLINDRICAL MAIN BODY, STACK COMPRISING SUCH A SATELLITE AND LAUNCH ASSEMBLY FOR SUCH A SATELLITE

(71) Applicant: AIRBUS DEFENCE AND SPACE SAS, Les Mureaux (FR)

(72) Inventors: René Cheynet de Beaupre, Toulouse (FR); Francis Palayret, Toulouse (FR); Philippe Bertheux, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 77 days.

(21) Appl. No.: 15/764,678

(22) PCT Filed: Sep. 30, 2016

(86) PCT No.: PCT/FR2016/052507
§ 371 (c)(1),
(2) Date: Mar. 29, 2018

(87) PCT Pub. No.: WO2017/055770
PCT Pub. Date: Apr. 6, 2017

(65) Prior Publication Data
US 2018/0265227 A1 Sep. 20, 2018

(30) Foreign Application Priority Data
Oct. 2, 2015 (FR) ...................................... 15 59386

(51) Int. Cl.
*B64G 1/64* (2006.01)
*B64G 1/10* (2006.01)
(Continued)

(52) U.S. Cl.
CPC ............... *B64G 1/641* (2013.01); *B64G 1/10* (2013.01); *B64G 1/1021* (2013.01); *B64G 1/26* (2013.01);
(Continued)

(58) Field of Classification Search
CPC .... B64G 1/641; B64G 1/1021; B64G 1/1028; B64G 1/105; B64G 2001/1057; B64G 1/26; B64G 1/40; B64G 2001/643
See application file for complete search history.

(56) References Cited

U.S. PATENT DOCUMENTS 4,009,851 A * 3/1977 Cable ...................... B64G 1/10
244/173.1
5,169,094 A * 12/1992 Maute ..................... B64G 1/007
244/158.1
(Continued)

FOREIGN PATENT DOCUMENTS

| EP | 2202553 A1 | 6/2010 |
| EP | 2772441 A2 | 9/2014 |
| FR | 2932576 A1 | 12/2009 |

OTHER PUBLICATIONS

International Search Report, dated Jan. 2, 2017, from corresponding PCT application No. PCT/FR2016/052507.

*Primary Examiner* — Philip J Bonzell
(74) *Attorney, Agent, or Firm* — Young & Thompson (57) ABSTRACT

Disclosed is a satellite including a cylindrical main body, the main body having an inner wall defining an inner space and an outer wall, and extending along a main axis between a lower end surface and an upper end surface, at least one of the lower end surface and the upper end surface including an interface mechanism intended for engaging with a complementary interface mechanism of another satellite or of a launcher, the satellite also including at least one external device attached to the outer wall of the main body, the outer
(Continued)

device extending to project transversely from the outer wall relative to the main axis.

14 Claims, 7 Drawing Sheets

(51) Int. Cl.
  *B64G 1/26* (2006.01)
  *B64G 1/28* (2006.01)
(52) U.S. Cl.
  CPC .............. *B64G 1/285* (2013.01); *B64G 1/286* (2013.01); *B64G 2001/1028* (2013.01); *B64G 2001/643* (2013.01)

(56) References Cited

U.S. PATENT DOCUMENTS

| | | | | |
|---|---|---|---|---|
| 5,337,980 A * | 8/1994 | Homer | .................. | B64G 1/641 |
| | | | | 244/159.4 |
| 6,082,678 A * | 7/2000 | Maute | .................. | B64G 1/007 |
| | | | | 244/164 |
| 6,264,145 B1 * | 7/2001 | Maute | .................. | B64G 1/007 |
| | | | | 244/171.1 |
| 6,523,784 B2 * | 2/2003 | Steinsiek | ............. | B64G 1/1078 |
| | | | | 244/172.4 |
| 7,840,180 B2 * | 11/2010 | Rosen | ...................... | H04N 7/20 |
| | | | | 455/12.1 |
| 8,016,240 B2 * | 9/2011 | Caplin | ................. | B64G 1/1085 |
| | | | | 244/158.5 |
| 8,511,617 B2 * | 8/2013 | Caplin | ................. | B64G 1/1085 |
| | | | | 244/158.1 |
| 8,939,409 B2 | 1/2015 | Apland et al. | | |
| 9,027,889 B2 | 5/2015 | Aston et al. | | |
| 9,446,863 B2 * | 9/2016 | Cheynet de Beaupre | .................. | |
| | | | | B64G 1/10 |
| 2002/0063188 A1 * | 5/2002 | Steinsiek | ............. | B64G 1/1078 |
| | | | | 244/172.4 |
| 2007/0080260 A1 | 4/2007 | Lancho Doncel | | |
| 2008/0155610 A1 * | 6/2008 | Rosen | ................ | H04B 7/18523 |
| | | | | 725/64 |
| 2008/0237399 A1 * | 10/2008 | Caplin | ................. | B64G 1/1085 |
| | | | | 244/158.4 |
| 2009/0224105 A1 * | 9/2009 | Caplin | ................. | B64G 1/1085 |
| | | | | 244/158.4 |
| 2012/0154585 A1 | 6/2012 | Miranda | | |
| 2012/0217348 A1 * | 8/2012 | Aguirre Martinez | ........................ | |
| | | | | B64G 1/1021 |
| | | | | 244/158.5 |
| 2013/0099059 A1 * | 4/2013 | Cheynet De Beaupre | .................. | |
| | | | | B64G 1/10 |
| | | | | 244/158.1 |
| 2013/0221162 A1 | 8/2013 | Darooka | | |
| 2018/0290768 A1 * | 10/2018 | Faye | ........................ | B64G 1/10 |

* cited by examiner

SATELLITE WITH CYLINDRICAL MAIN BODY, STACK COMPRISING SUCH A SATELLITE AND LAUNCH ASSEMBLY FOR SUCH A SATELLITE

BACKGROUND OF THE INVENTION

Field of the Invention

The invention relates to the field of space vehicles, and more particularly the field of satellites intended for placing into orbit.

Description of the Related Art

A satellite conventionally comprises a body forming a support for the items of equipment of the satellite. The items of equipment can be divided into two categories. The first category is called the payload and comprises the main instrument of the mission as well as the electronic devices necessary for its correct operation. It is for example an optical instrument, in the case of a mission intended for collecting images and optical measurements, or one or more antennas in the case of telecommunication satellites. The second category comprises items of equipment denoted in the present application as secondary, intended for the general operation of the satellite such as thrusters, receiving antennas, tanks or solar panels as well as electronic devices ensuring the control and command of these ancillaries.

The launch of a satellite for placing into orbit is conventionally carried out using a launcher in which the satellite is placed. The launcher comprises propulsion means allowing it to reach the intended destination and to release the satellite there.

In order to reduce costs, it is known to use one launcher for placing several satellites into orbit, during the course of one and the same launch. This is then referred to as multiple launch.

The problems to be solved are, in particular, holding the satellites in the launcher and storing them in the nosecone.

In fact, during the launch, then at the time of release, the satellites are subjected to impacts and vibrations transmitted from the launcher to the satellites. The arrangement of the satellites in the launcher must therefore avoid the impacts and vibrations propagating excessively in the satellites and damaging the items of equipment while ensuring good mechanical strength of all of the satellites in the launcher.

A known solution for a multiple launch consists of connecting the satellites to a central structure of the launcher, called a dispenser, which forms housings in which the satellites are placed. Document U.S. Pat. No. 8,939,409 describes an example dispenser. A dispenser typically comprises on the one hand components fixed to the launcher and optionally on the other hand components fixed to the satellites, i.e. on the one hand interface components intended to remain in the launcher after releasing the satellites, and on the other hand interface components intended to accompany the released satellites. The satellites are thus supported by the dispenser in the manner of a set of shelves, and do not support one another. However, such a structure is bulky and is only suitable for satellites of small dimensions, or limits the number of satellites capable of being installed in the launcher due to the size of the nosecone. Moreover, it constitutes an increase in the weight of the launcher, while being unnecessary for the mission.

Another solution then consists of stacking the satellites one on top of another providing, on the actual structure of each satellite, a dedicated interface for the stack.

Document U.S. Pat. No. 8,511,617 (corresponding to US patent application 2009/224105) proposes an example satellite stack having a dedicated interface structure. In this document, the dedicated structure is in the form of an outer cylinder, the cylinders then serving as a path for the transmission of the loads when the satellites are stacked. The diameter of the cylinder of a satellite is comprised in this document between 2 m and 5 m.

A drawback of the structure is that it has a significant diameter compared to the standard launcher interface diameters in the space field. In fact, in order to fit a satellite into a launcher, the latter comprises a satellite interface ring on which the satellite is fixed. So that the launcher is compatible with several satellites, it is known for the satellite interface ring of the launcher to have a standard diameter, selected from 937 mm (millimetres), 1194 mm and 1666 mm. Consequently, the dedicated structure described in U.S. Pat. No. 8,511,617 cannot be mounted directly on the satellite interface ring of the launcher, but an intermediate support must be placed between the satellite and the ring of the launcher in order to make the connection between the two diameters. Moreover, the diameter of the dedicated structure is greater than the largest of the standard diameters, filling almost all of the space below the nosecone of the launcher, so that all of the items of equipment of the satellite are located inside the cylinder of the dedicated structure.

EP 2202553 discloses a space telescope, and US 2012/154585 relates to an integrated microsatellite antenna system.

Consequently, there is a need for a novel satellite having a structure making it possible in particular to overcome the aforementioned drawbacks.

BRIEF SUMMARY OF THE INVENTION

Thus, a first subject of the invention is to propose a satellite capable of being installed in a launcher with good mechanical strength.

A second subject of the invention is to propose a satellite capable of being stacked with another satellite with satisfactory rigidity.

A third subject of the invention is to propose a satellite making it possible to arrange the items of equipment in order to optimize the space below the nosecone of a launcher.

A fourth subject of the invention is to propose a satellite in which the mounting of the items of equipment on the body of the satellite is simplified.

A fifth subject of the invention is to propose a satellite for which the installation in a launcher is simplified.

A sixth subject of the invention is to propose a satellite capable of incorporating an optical instrument.

A seventh subject of the invention is to propose a satellite intended for stacking that has reduced weight.

An eighth subject of the invention is to propose a satellite intended for stacking that is easily manufactured.

According to a first aspect, the invention proposes a satellite comprising a cylindrical main body. The main body has an inner wall delimiting an inner space and an outer wall, and extends along a main axis between a lower end surface and an upper end surface. At least one of the lower end surface and the upper end surface comprises an interface mechanism intended for engaging with a complementary interface mechanism of another satellite or of a launcher. Moreover, the satellite comprises at least one internal item of equipment, fixed on the inner wall of the main body and extending at least partially into the inner space, and at least one external item of equipment fixed on the outer wall of the main body. The external item of equipment extends as a transverse projection from the outer wall with respect to the main axis, the at least one external item of equipment being capable of being an electronic component, a tank of propellants, a control momentum gyroscope, or a reaction wheel.

The satellite thus designed makes it possible in particular to optimize the available space in the volume below the nosecone of a launcher, by using both the inner space and the surface of the outer wall of the body.

According to an embodiment, the main body comprises a cylinder having an average diameter corresponding to a standard diameter in the space field, selected from the following values: 937 mm, 1194 mm and 1666 mm.

The main body can then rest directly on, and be directly attached to, an interface ring of a launcher, without the intermediary of an adapter. The assembly thus formed creates a load transmission path between the interface ring and the body that is substantially parallel to the main axis of the main body, increasing the rigidity of the assembly.

According to an embodiment, the outer wall of the main body comprises at least one portion of plane surface, forming a facet, on which the external item of equipment is fixed. The facet facilitates mounting of the external item of equipment.

According to an embodiment, the main body is produced from parts made from monolithic aluminium.

The internal item of equipment comprises for example an optical imaging instrument. The internal item of equipment comprises for example the electronics associated with the optical instrument.

The internal item of equipment can comprise an optical instrument comprising a sighting axis orientated parallel to the main axis of the main body. The internal item of equipment can also comprise a mounting plate fixed to the inner wall of the main body and which extends at least partially outside the inner space, beyond the upper end surface of the main body. The optical instrument is then rigidly fixed to the mounting plate. The sighting axis of the optical instrument is preferably orientated towards the lower end surface of the main body, and the mounting plate extends at least partially beyond the upper end surface of the main body.

According to an embodiment, the interface mechanism is linear. For example, the interface mechanism comprises a clamp band system.

According to a second aspect, the invention proposes a satellite stack comprising at least two satellites as presented above. The main axes of the main bodies of the two satellites are parallel to one another. An interface mechanism of the upper end surface of a first satellite is in contact along the main axes with an interface mechanism of the lower end surface of the body of the second satellite. The interface mechanisms then engage with one another in order to firmly fix the two satellites together.

According to an embodiment, the internal item of equipment of the first satellite partially extends into the inner space of the second satellite.

According to a third aspect, the invention proposes a launch assembly comprising a launcher and at least one satellite as presented above. The launcher then comprises a nosecone defining a housing for at least one satellite and an interface ring and the lower end surface of the main body of the satellite comprises an interface mechanism in order to be firmly fixed to the interface ring of the launcher.

BRIEF DESCRIPTION OF THE DRAWINGS

Other characteristics and advantages will become apparent in the light of the description of embodiments of the invention, accompanied by the figures in which.

DETAILED DESCRIPTION OF THE PREFERRED EMBODIMENTS

Figure 1:
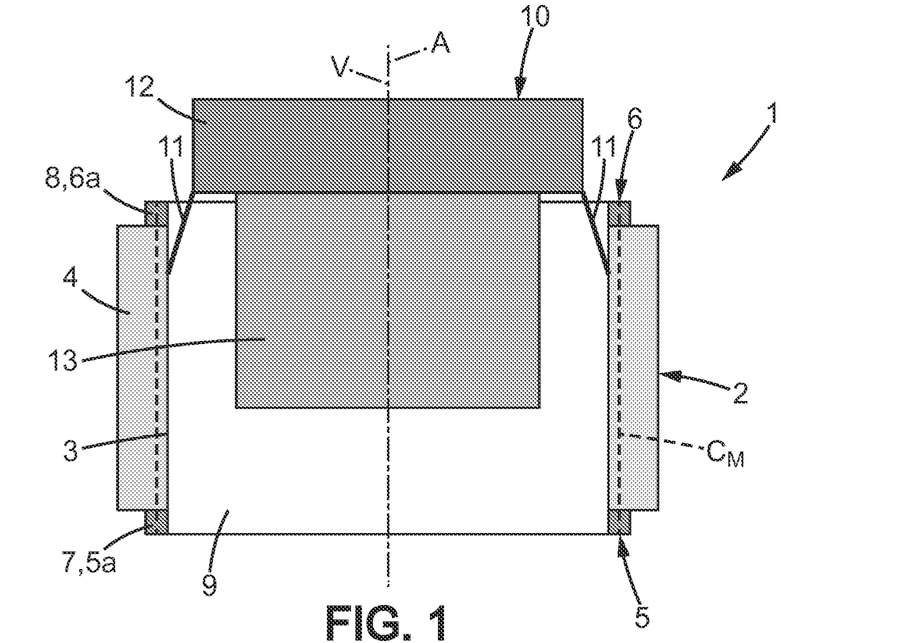
FIG. 1 is a diagrammatic representation of a cross-section view of a satellite.
Figure 2:
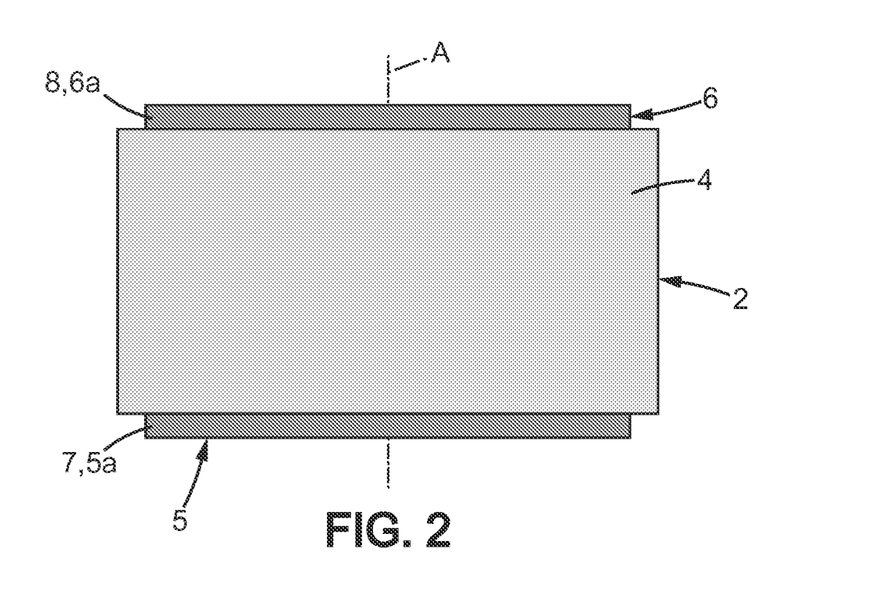
FIG. 2 is a diagrammatic representation of a side view of the body of the satellite of FIG. 1.
Figure 3:
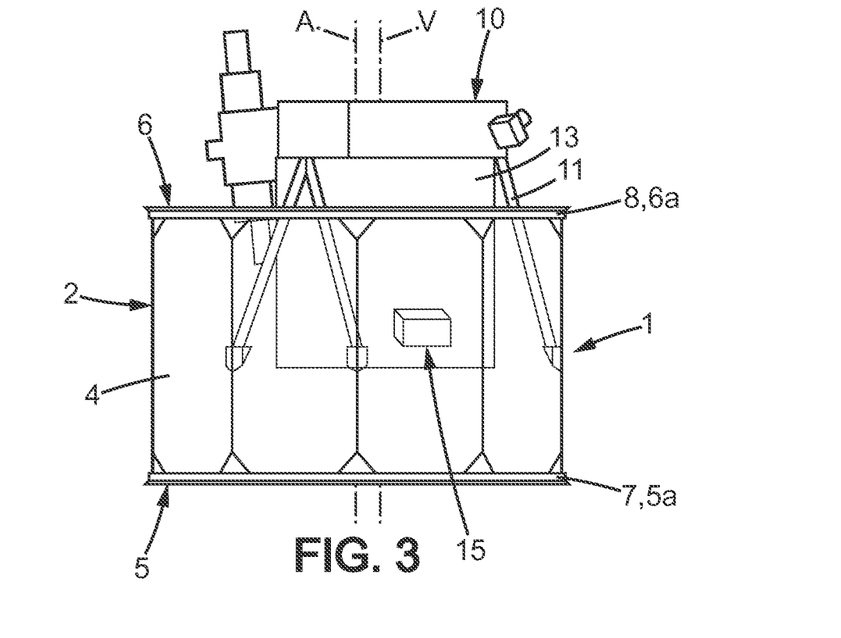
FIG. 3 is a side view of a satellite according to an embodiment in which the satellite comprises an optical instrument.
Figure 4:
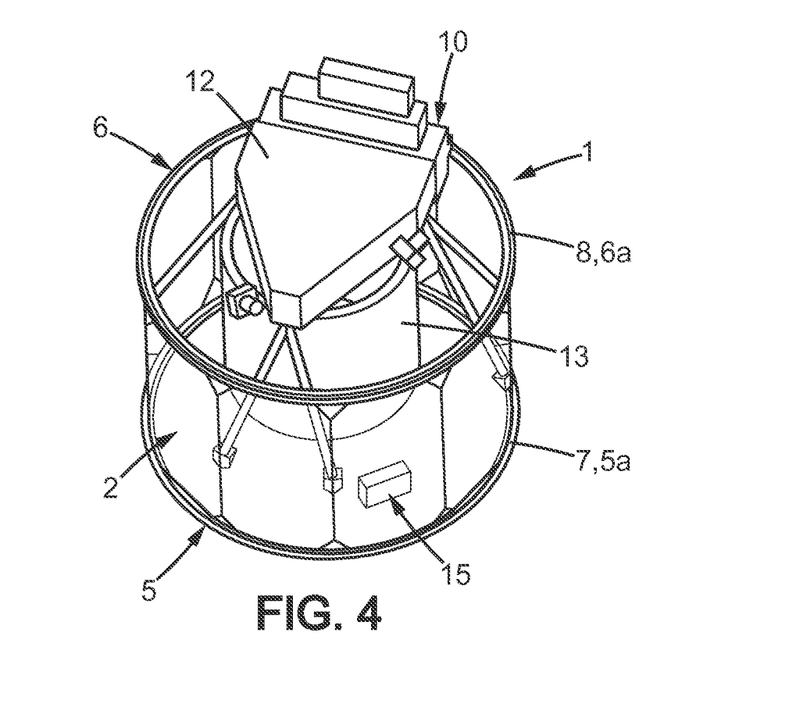
FIG. 4 is a three-dimensional top view of the satellite of FIG. 3.
Figure 5:
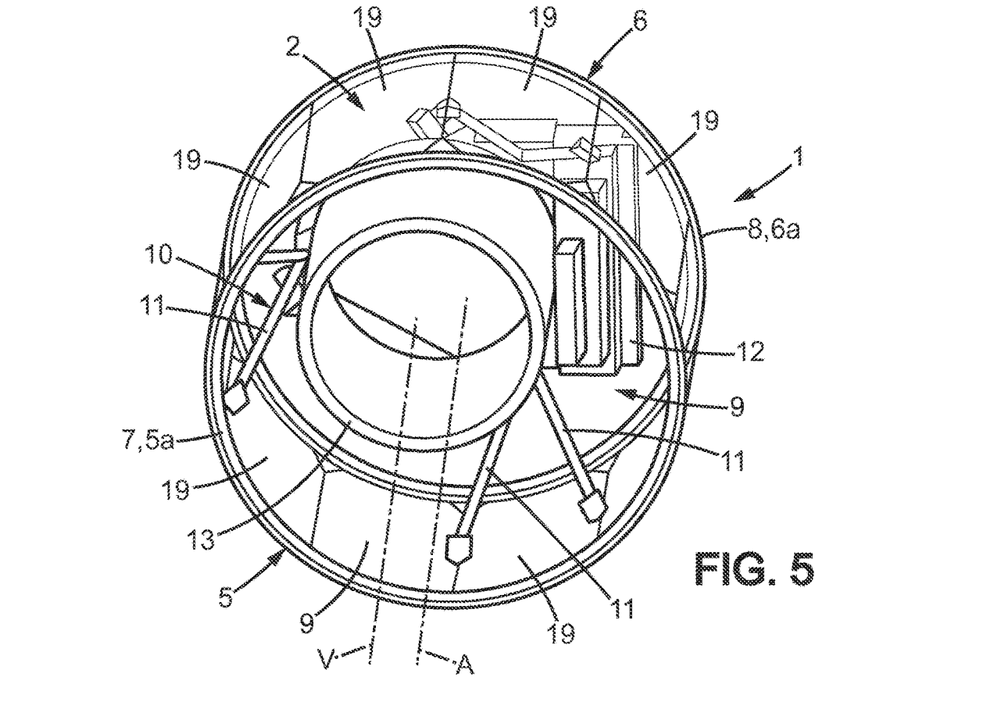
FIG. 5 is a three-dimensional bottom view of the satellite of FIG. 3.

FIG. 1 diagrammatically represents a satellite 1, intended for being placed in orbit around the Earth by means of a launcher. The satellite 1 comprises a main body 2, having a generally cylindrical shape extending along a main axis A.

Hereinafter, the adjective "longitudinal" and its variants denote that which is parallel to the main axis A; the adjective "transversal" and its variants denote that which is comprised in a plane perpendicular to the main axis A.

The adjective "cylindrical" must be understood herein in its broadest sense as defining a surface delineated by a generatrix line describing a directing curve. The directing curve can be circular, the main body 2 then having a tubular or polygonal shape, the main body 2 then having the shape of a prism.

The main body 2 has an inner wall 3 and an outer wall 4, which define a thickness of the main body 2.

Hereinafter, the adjective "inner" and its variants denote that which is turned towards or close to the main axis A, as opposed to the adjective "outer" and its variants, which denote that which is turned opposite to or away from the main axis A.

The main body 2 extends along the main axis A between an end surface 5 called lower and an end surface 6 called upper. In order to give the stack of several satellites 1 good mechanical strength, as will be explained below, the two end surfaces 5, 6 have identical transverse dimensions, making it possible to match together the upper end surface 6 of a satellite 1 and the lower end surface 5 of another satellite.

The diameter of the lower end surface 5 is then compatible with the standard diameters in the space field, and which are those applied to the satellite interface ring of the launchers: 937 mm, 1194 mm and 1666 mm.

More precisely, the diameter of the lower end 5 denotes here, for the sake of simplicity, the diameter of the average circle at the main body 2, between the inner surface 3 and the outer surface 4, at the level of the lower end 5. The diameter of the lower end 5 is then substantially equal to one of the standard values mentioned above.

Consequently, it is possible to define for the cylindrical body 2 an average cylinder $C_M$ the directing curve of which is a circle having a diameter substantially equal to one of the standard values mentioned above, the average cylinder $C_M$ extending over the entire longitudinal dimension of the cylindrical body 2, between the two end surfaces 5, 6, and comprised, again over its entire longitudinal dimension, between the inner wall 3 and the outer wall 4.

At least one of the lower end surface 5 and the upper end surface 6 comprises an interface mechanism, intended for engaging with another, complementary, interface mechanism, of a satellite interface of a launcher or of another satellite. According to a particular embodiment, the lower end surface 5 comprises a lower interface mechanism 7 and the upper end surface 6 comprises an upper interface mechanism 8.

The interface mechanisms 7, 8 thus make it possible for the satellite 1 to be brought into contact with and to be firmly joined to another satellite or to a satellite interface ring of a launcher. Advantageously, the lower interface mechanism 7 is complementary to the upper interface mechanism 8, allowing two satellites 1 as presented above to be stacked and firmly fixed together by their matched interface mechanisms 7, 8.

The mechanisms, respectively interface mechanisms 7, 8, are for example linear, i.e. they extend continuously over the entire circumference of the ends, respectively 5, 6 of the main body 2. According to an example embodiment, the lower interface mechanism 7 of the satellite 1 comprises an interface ring and the upper interface mechanism 8 of this same satellite 1 also comprises a ring the shape of which allows it to fit onto the ring of the lower interface mechanism 7 of another satellite. As will be explained below, the upper interface mechanism 7 and/or the lower interface mechanism 8 comprises a releasable clamp band system which makes it possible to tightly fit and hold firmly fixed together two complementary interface mechanisms of two stacked satellites by means of a clamp band. The diameter of the rings of the interface mechanisms 7, 8 corresponds to the average cylinder diameter $C_M$.

The inner wall 3 defines an inner space 9, extending between the two end surfaces 5, 6 of the main body 2. An internal item of equipment 10 is in contact with, and fixed to, the inner wall 3 so as to extend at least partially into the inner space 9.

By "item of equipment" is meant here any instrument, set of instruments or all the electronics of the satellite. For example, the internal item of equipment 10 comprises arms 11 extending transversally to the main axis A, one end of which is in contact with and fixed onto the inner wall 3 and the other end is in contact with and fixed onto the internal item of equipment 10.

Preferably, the internal item of equipment 10 comprises the payload of the satellite, i.e. the main item of equipment necessary for the mission of the satellite 1.

According to an example embodiment of the satellite, which is the one shown in the figures, the payload comprises an optical instrument 13. The internal item of equipment 10 can then comprise a mounting plate 12 on which the instrument 13 is rigidly fixed. The arms 11 are advantageously also fixed on the plate 12. The plate 12 can contain one or more optical detectors which preferentially have an unobstructed view on at least one face for good cooling by radiation. This is why the plate 12 can emerge beyond one of the ends 5, 6 of the main body 2 of the satellite 1, outside the inner space 9.

The optical instrument 13 is defined in particular by a sighting axis V, virtually defining the direction in which the optical instrument "sees", and by a field of view, defining the cone of entry of the light rays into the optical instrument 13.

Preferably, the plate 12 emerges outside the inner space 9 via the upper end surface 6. Thus, the sighting axis V of the optical instrument 13 is directed towards the lower end surface 5 of the main body 2.

Apart from its load transmission function in a satellite stack, the main body 2 can provide other functions, in particular protection functions for the internal item of equipment 10. For example, the main body 2 can serve as a baffle. Preferably, the fragile components of the optical instrument 13 are fully comprised within the inner space 9. The fragile components are for example mirrors and their support. The main body 2 then forms a barrier preventing the sun's rays from reaching the fragile components of the optical instrument 13.

In a variant or in combination, the main body 2 can be made from monolithic aluminium, as opposed to a composite material for example with an aluminium skin and honeycomb aluminium, so as to form a heat distributor for the external item of equipment 15. Moreover, the items of equipment can be fixed directly onto the structure, without the use of inserts, unlike the composites currently used in the space field.

Preferably the main body 2 and the lower and upper interface mechanisms form a single monolithic piece, which can be obtained by machining an aluminium cylinder. In this case the load transmission capacity and the rigidity of the assembly are increased, in particular if it is combined with a linear interface mechanism 7, 8, as indicated above, such as a clamp band.

It is also possible to machine secondary support structures directly, for holding the items of equipment or the instrument.

According to this example, the internal item of equipment 10 also comprises the electronics associated with the instrument 13. The electronics are then for example directly in contact with, and fixed onto, the inner wall 3, in the inner space 9, so that they can be mounted as a single unit with the instrument 13. In fact, the instrument 13 and its electronics are generally delivered at the assembly site of the satellite 1 as an assembly, the connections of which are tested and certified as functional. Any disconnection involves the requirement to test the connections again. Thus, by retaining the assembly formed by the instrument 13 and its electronics in order to fix it onto the inner wall 3 of the main body 2, disconnections are avoided.

The sighting axis V of the optical instrument 13 can be merged with the main axis A, in which case the electronics of the instrument can be distributed around the instrument 13 in the inner space 9. However, the sighting axis V is preferably parallel to the main axis A but offset, so as to clear a region in the inner space 9 for placing the electronics of the instrument. Also in a variant, the sighting axis V can be inclined with respect to the main axis A.

The satellite 1 also comprises at least one external item of equipment 15, in contact with and fixed onto the outer wall 4 of the body 2 of the satellite, and therefore extending outside the inner space 9. The external item of equipment 15 is chosen from electronics, for example satellite control electronics 16, a propellant tank 18, a Control Momentum Gyroscope (CMG) 17 or a momentum wheel. Other external secondary items of equipment can also be fixed onto the outer wall 4, for example sensors, thrusters making it possible to correct the trajectory of the satellite 1 if need be, or also solar panels.

Figure 6:
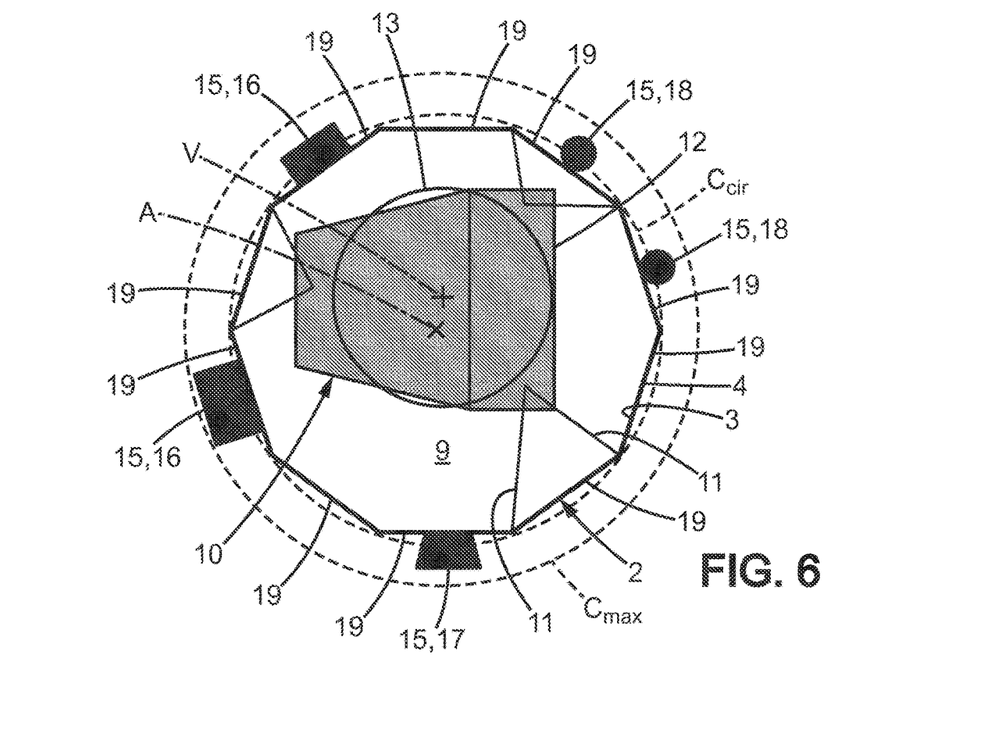
FIG. 6 is a diagrammatic representation of a cross-section view of a satellite stack of FIG. 1.

The external item of equipment 15 therefore forms a projection transverse to the main axis A on the outer wall 4 over a controlled dimension, corresponding to the space in the launcher. For example, the external item of equipment 15 defines a circle $C_{max}$, circumscribing the external item of equipment 15, the diameter of which is greater than the diameter of the circle $C_{cir}$ circumscribing the outer wall 4 of the main body 2 by at least 20% (FIG. 6). It is possible to mount items of equipment of larger size, with optionally, additional external secondary structures connected to the main body. Flat solar panels can also be mounted. The circle diameter $C_{max}$ can then be greater by 30% or even 40% or 50% than that of the circumscribed circle $C_{cir}$. The practical limit is the diameter of the nosecone of the launcher used.

Thus, as the average cylinder diameter $C_M$ corresponds to a standard diameter, space is cleared around the main body 2 when the satellite 1 is placed below the nosecone of a launcher, making it possible to fix the bulky external items of equipment 15 projecting on the outer wall 4. The space requirement below the nosecone is thus optimized.

According to an embodiment, the outer wall 4 of the body 2 of the satellite can comprise a flat portion which may, but does not necessarily, extend over the entire dimension along the main axis A so as to form a facet. For example, when the directing curve of the main body 2 is a polygon as shown in FIGS. 3 to 6, the outer wall 4 is formed from a succession of substantially plane facets 19, particularly suitable for the fastening of the external item of equipment 15, and in particular for the electronics.

Thus, the main body 2 offers mounting possibilities for the internal items of equipment 10 and external items of equipment 15 that are particularly suitable for optimizing the available space below the nosecone of the launcher.

The satellite 1 thus described is capable of being stacked with other satellites and being placed below the nosecone of a launcher.

Figure 7:
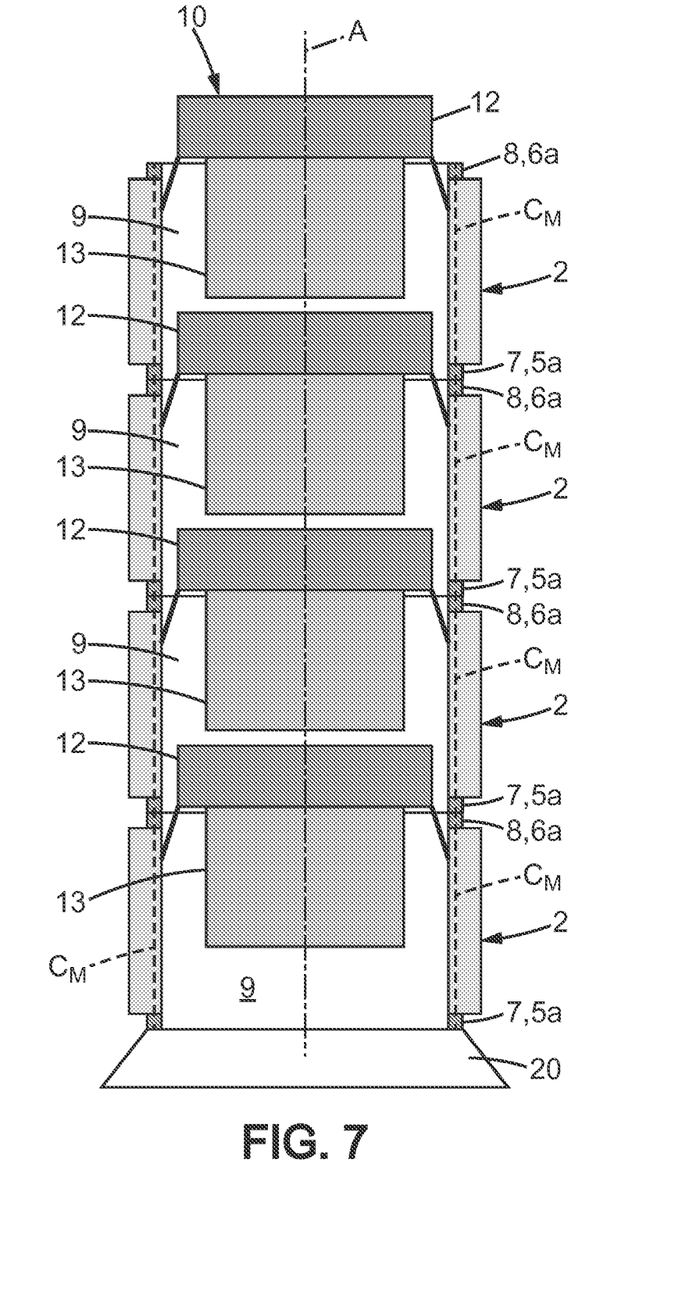
FIG. 7 is a diagrammatic representation of a cross-section view of a satellite of FIG. 1 stacked with a satellite of another structure.

A first example of a stack is shown in FIG. 7. According to this example, four substantially identical satellites 1 as described above are stacked one above another by their main body 2. The satellites 1 are arranged along one and the same main axis A, and their internal item of equipment 10 comprises an optical instrument 13 the sighting axis V of which is directed towards the lower end surface 5. The four satellites 1 have a main body 2 centred on an average cylinder $C_M$ of the same diameter.

According to the example, a first satellite 1 is fixed to the launcher by its lower interface mechanism 7. More specifically, the launcher comprises a satellite interface mechanism, typically a ring 20, complementary to the ring of the lower interface mechanism 7 of a first satellite 1. The first satellite 1 is then placed so that its lower interface mechanism 7 fits onto the ring of the launcher interface mechanism. As the ring of the lower interface mechanism 7 of the first satellite is equal to the average cylinder diameter $C_M$, which corresponds to the diameter of the ring 20 of the satellite interface mechanism of the launcher, it is not necessary to place an adapter between the ring 20 of the launcher and the first satellite 1. The launcher also comprises a releasable clamp band system, the clamp band of which grips the ring 20 of the launcher interface mechanism and the ring of the lower interface mechanism 7 of the first satellite. The first satellite 1 is thus firmly fixed to the launcher.

A second satellite 1 is stacked onto the first satellite 1, the ring of the lower interface mechanism 7 of the second satellite being fitted onto the ring of the upper interface mechanism 8 of the first satellite. The upper interface mechanism 8 of the first satellite then comprises a releasable clamp band system the clamp band of which grips the ring of the upper interface mechanism 8 of the first satellite 1 and the ring of the lower interface mechanism 7 of the second satellite.

A third satellite is similarly stacked on the second satellite 1, and a fourth satellite 1 is stacked on the third satellite. The fourth, and last, satellite 1 has no clamp band system.

Here again, as all the satellites of the stack are centred according to one and the same average cylinder $C_M$, no adapter between the satellites 1 is required.

The main axes A of the satellites 1 stacked in this way are merged. Similarly, the sighting axes V of the optical instruments 13 are all substantially parallel.

According to the example presented here, as the optical instrument 13 of each satellite 1 is at a distance from the lower end surface 5 of the body 2 of the corresponding satellite, the internal items of equipment 10 can straddle the inner space 9 of two stacked satellites 1. In fact, the plate 12 emerging via the upper end surface 6 of a lower satellite can lodge in the inner space 9 of the upper satellite, between the optical instrument 13 and the lower end surface 5 of the upper satellite 1.

The external items of equipment 15 of the satellites 1, extending transversally from the outer wall 4 of the body 2 of each satellite 1 do not interfere with one another.

Moreover, as there is no change in diameter from the ring 20 of the launcher to the main body 2 of the fourth satellite 1, the mechanical strength of the stack is increased. The average cylinder $C_M$ of the stacked satellites 1 is substantially continuous from one to another and with the satellite interface ring 20 of the launcher, materializing the path through which the loads are transmitted between satellites. The transmission path of the loads therefore extends almost exclusively longitudinally from the satellite interface ring 20 of the launcher to the fourth satellite 1 and only passes through the main body 2 of the satellites 1, which allows the stack to have good mechanical strength. The internal item of equipment 10 of each satellite 1 is protected from the vibrations and the impacts, as loads are not transmitted thereto.

The linear connection provided by the clamp band systems also ensures good distribution of the loads over the entire circumference of the main bodies 2 of the satellites 1.

As a consequence of the design of the satellites 1 and their stacking, the sighting axis V of each of the optical instruments 13 is orientated towards the satellite interface ring of the launcher.

This orientation of the sighting axis V makes it possible for the satellite to be more compact. In fact, in particular in the case where the optical instrument 3 is an imaging instrument, by orienting the sighting axis V towards the satellite interface ring of the launcher, the diameter of the mirrors of the optical instrument 3 can be increased, while retaining the dimensional relationships that are optically required within the instrument 3. The larger the diameter of the mirrors, the better the resolution of the optical instrument 3. Moreover, as the loads pass through the main body 2, the mounting plate 12 can have a reduced thickness with respect to the state of the art, making it possible to increase the dimension along the main axis A of the optical instrument 3 while retaining a total dimension along the axis A of the satellite that is adapted to the space in the launcher. Thus, by retaining the dimension of the satellite along the main axis A adapted to the space available in the launcher, the performances of the optical instrument 3 are increased.

When the satellites 1 must be released in space, each clamp band system is opened, so as to release the interface mechanisms 7, 8, for example by means of a pyrotechnic device remotely controlled from Earth, from the launcher or programmed in order to follow a determined release sequence. The separation between the satellites 1, and between the first satellite 1 and the satellite interface ring 20, can be facilitated by means of pre-stressed components, of the spring type, released when the clamp bands are opened.

The clamp band systems of the first, second and third satellites 1 preferably remain connected to their respective satellite once open. For example, each clamp band system comprises a connection point on the body of the corresponding satellite. When the first satellite 1 is released, the clamp band system of the launcher remains connected to the launcher.

According to a particular embodiment, each satellite 1 can have a system for capturing the clamp band system once open.

Figure 8:
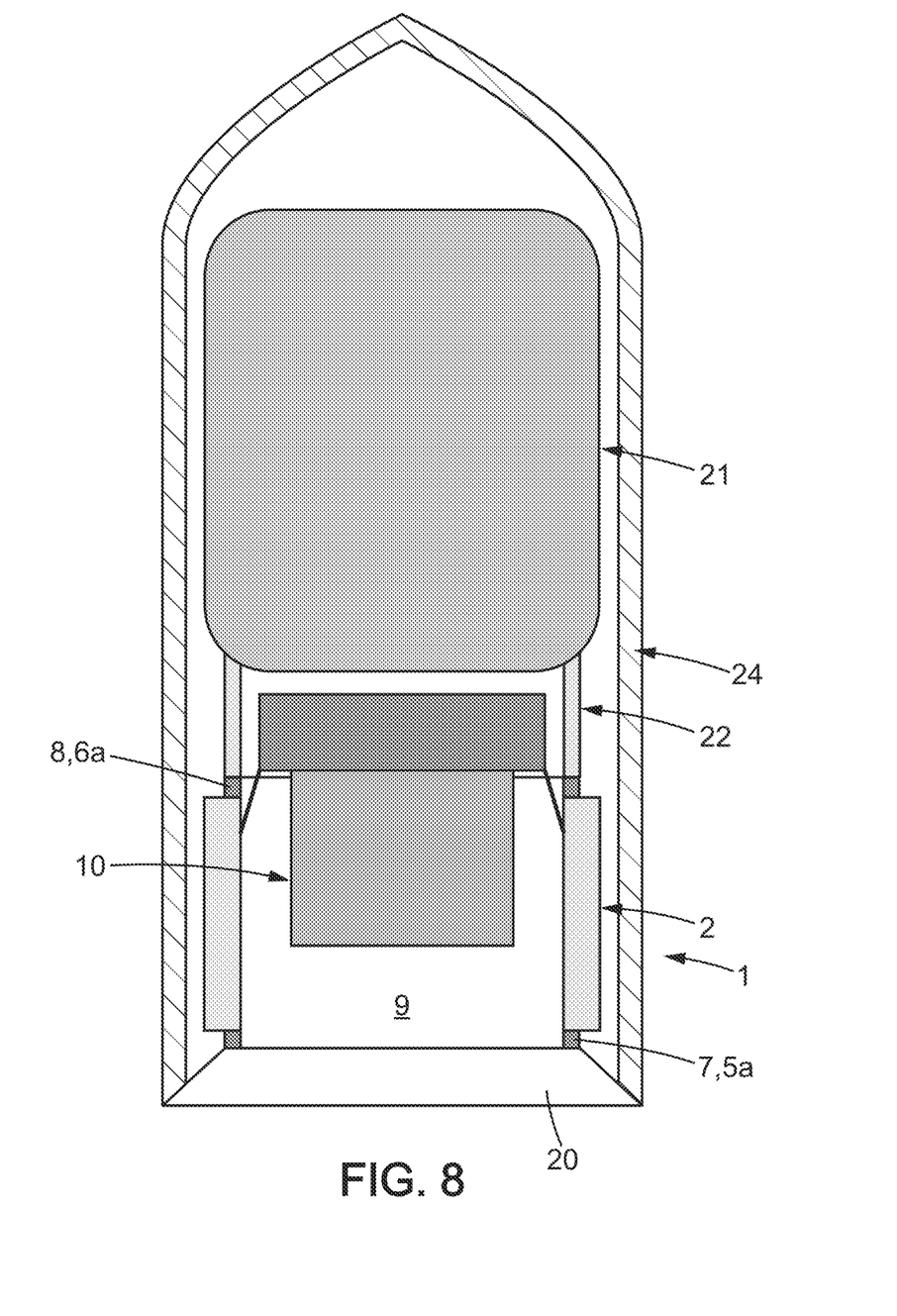
FIG. 8 is a diagrammatic view of a cross-section view of several satellite stacks of FIG. 1 on one and the same satellite interface of a launcher.

According to a particular embodiment, each satellite 1 must ensure the transmission of the command for opening the clamp band system to the following satellite 1, from the first satellite 1 to the fourth satellite 1. This being the case, the same order repeated n times makes it possible to release n satellites one by one. Figure 8 shows a second example of stacking a satellite 1 according to an embodiment of the invention and a different satellite 21. The different satellite 21 has in particular transverse dimensions that do not correspond to those of the end surfaces 5, 6 of the satellite 1 according to the invention. The satellite 1 according to the invention is mounted as previously on a satellite interface ring 20 of a launcher, and the different satellite 21 is stacked on the upper end surface 6 of the satellite according to the invention, with the aid of an adapter 22 making it possible to bridge the difference in transverse dimensions. The satellite 1 and different satellite 21 are placed below the nosecone 24 of a launcher, as described above.

Figure 9:
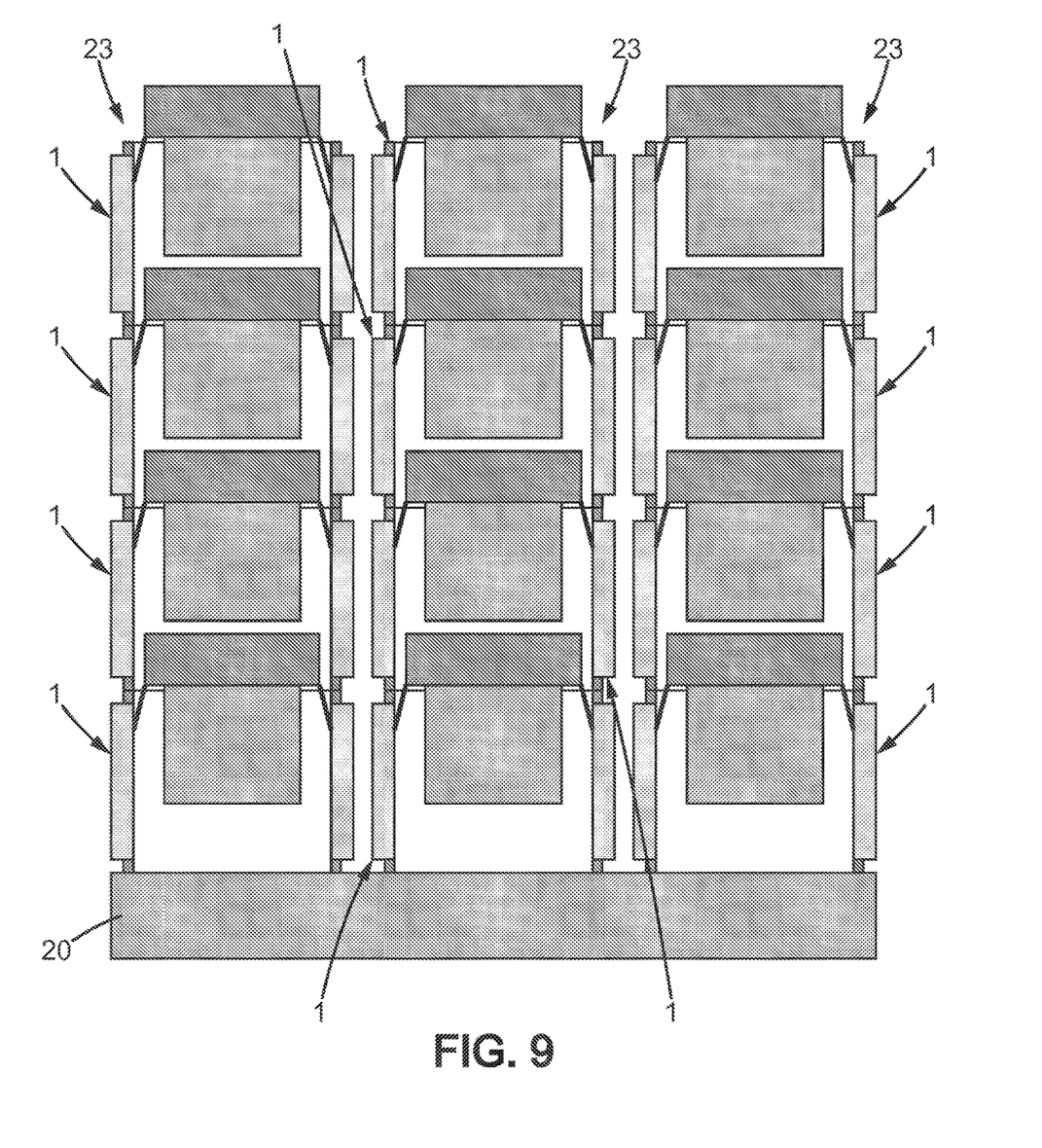
FIG. 9 is a cross-section view of an example embodiment of several satellite stacks on one and the same satellite interface of a launcher.
Figure 10:
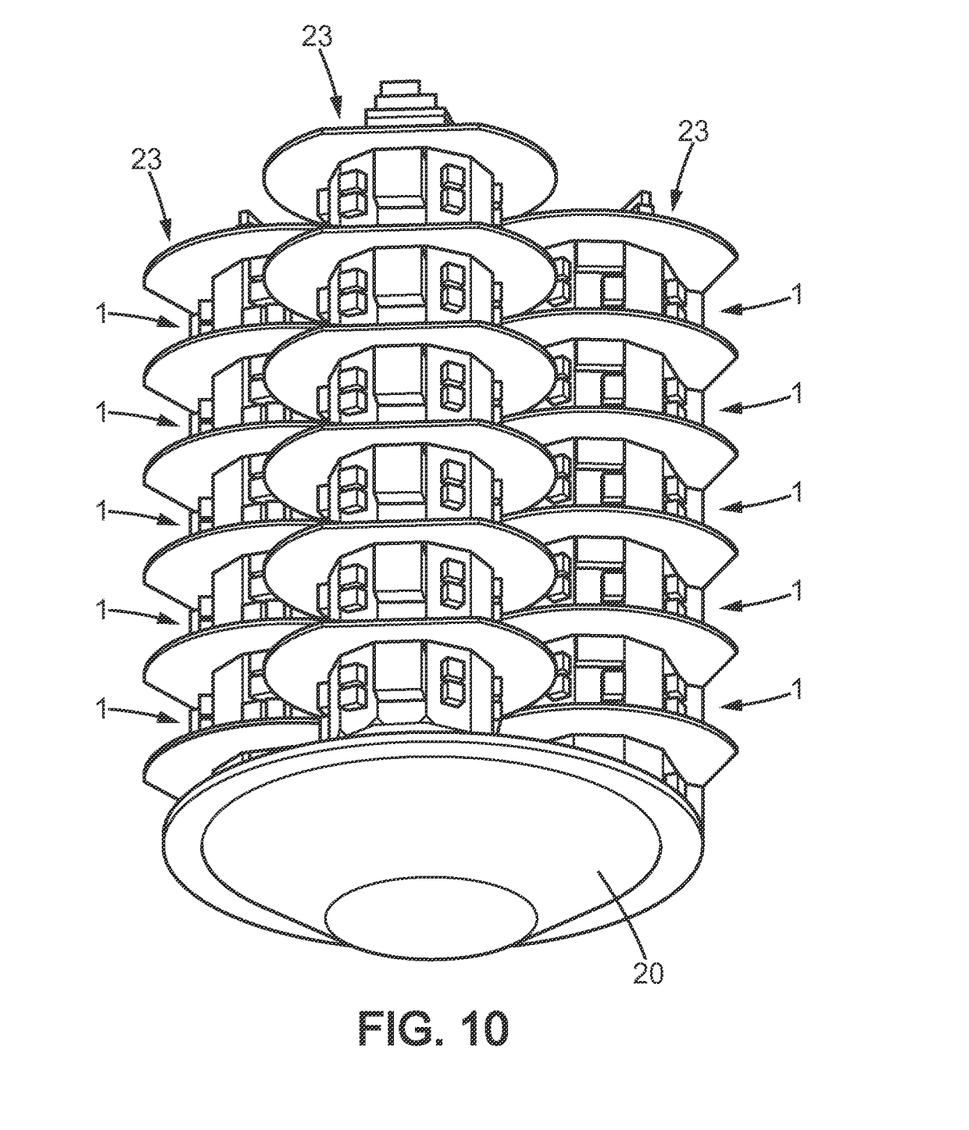
FIG. 10 is a three-dimensional bottom view of an example embodiment of several satellite stacks on one and the same satellite interface of a launcher.

FIGS. 9 and 10 show a third example of a satellite stack 1, substantially identical and according to the invention. According to this third example, several columns 23 of satellites 1 can be mounted side by side on one and the same satellite interface ring 20 of a launcher. The columns 23 can be aligned transversally or arranged in quincunx on the ring 20. An adapter is then mounted between the first satellite of each column 23 and the satellite interface ring 20.

The number of satellites 1 can be, but is not necessarily, the same in each column 23.

The column arrangement makes it possible for example to carry out release sequences in space per column 23, the satellites 1 of a column 23 being brought to a determined location from whence they can then be separated from one another. Thus, a single trajectory control device per column 23 can be installed.

The column arrangement also makes it possible to carry out per-section release sequences in space. The satellites of one and the same section are released at the same time. The following section can be released on a different orbit if the launcher is able to reignite its propulsion.

The invention claimed is:

1. A satellite comprising:
   a main body having a cylindrical shape, the main body having an inner wall delimiting an inner space and an outer wall extending along a main axis between a lower end surface and an upper end surface, the lower end surface comprising an interface mechanism configured to engage with a complementary interface mechanism of a launcher;
   at least one internal item of equipment, fixed onto the inner wall of the main body and extending at least partially into the inner space in which the outer wall of the main body comprises at least a portion of plane surface, forming a facet, the internal item of equipment comprising an optical imaging instrument, and electronics associated with the optical instrument, the optical instrument comprising a sighting axis oriented parallel to the main axis of the main body; and
   at least one external item of equipment fixed onto the outer wall of the main body, the external item of equipment extending as a transverse projection from the outer wall with respect to the main axis, the at least one external item of equipment being either a tank of propellants or an inertial actuator, the external item of equipment being fixed on the at least portion of plane surface that forms the facet.

2. The satellite according to claim 1, wherein the main body comprises a cylinder having an average diameter corresponding to a standard diameter in the space field, chosen from the following values: 937 mm, 1194 mm, and 1666 mm.

3. The satellite according to claim 1, wherein the upper end surface comprises an interface mechanism configured to engage with a complementary interface mechanism of the lower end surface of another satellite.

4. The satellite according to claim 1, wherein the main body is produced from parts made from monolithic aluminium.

5. A launch assembly comprising:
   a launcher comprising a nosecone defining a housing for at least one satellite and an interface ring, the lower end surface of the main body of the satellite comprising an interface mechanism in order to be firmly fixed to the interface ring of the launcher; and
   at least one said satellite according to claim 1.

6. The satellite according to claim 1, wherein the interface mechanism is linear.

7. The satellite according to claim 6, wherein the interface mechanism comprises a clamp band system.

8. A satellite stack comprising:
   first and second said satellites according to claim 1,
   wherein, in the first satellite, the upper end surface comprises an interface mechanism configured to engage with a complementary interface mechanism of the lower end surface the second satellite, the main axes of the main bodies of the first and second satellites being parallel,
   the interface mechanism of the upper end surface of the first satellite being in contact along the main axes with the interface mechanism of the lower end surface of the body of the second satellite, the interface mechanisms engaging with one another in order to firmly fix the first and second satellites together.

9. The satellite stack according to claim 8, wherein the internal item of equipment of the first satellite extends partially into the inner space of the second satellite.

10. The satellite of claim 1, wherein the at least one external item of equipment is an inertial actuator.

11. The satellite of claim 10, wherein the inertial actuator is a control momentum gyroscope.

12. The satellite of claim 10, wherein the inertial actuator is a momentum wheel.

13. A satellite comprising:

a main body having a cylindrical shape, the main body having an inner wall delimiting an inner space and an outer wall extending along a main axis between a lower end surface and an upper end surface, the lower end surface comprising an interface mechanism configured to engage with a complementary interface mechanism of a launcher;

at least one internal item of equipment, fixed onto the inner wall of the main body and extending at least partially into the inner space in which the outer wall of the main body comprises at least a portion of plane surface, forming a facet, the internal item of equipment comprising an optical imaging instrument, and electronics associated with the optical instrument, the optical instrument comprising a sighting axis oriented parallel to the main axis of the main body; and at least one external item of equipment fixed onto the outer wall of the main body, the external item of equipment extending as a transverse projection from the outer wall with respect to the main axis, the at least one external item of equipment being either a tank of propellants or an inertial actuator, the external item of equipment being fixed on the at least portion of plane surface that forms the facet, wherein the internal item of equipment comprises a mounting plate fixed to the inner wall of the main body and extending at least partially outside the inner space, beyond the upper end surface of the main body, and the optical instrument is rigidly fixed to the mounting plate.

14. The satellite according to claim 13, wherein the sighting axis of the optical instrument is oriented towards the lower end surface of the main body.

* * * * *